United States Patent [19]
Inoue et al.

[11] Patent Number: 6,078,024
[45] Date of Patent: Jun. 20, 2000

[54] AIR CONDITIONING APPARATUS HAVING ELECTRIC HEATING MEMBER INTEGRATED WITH HEATING HEAT EXCHANGER

[75] Inventors: Yoshimitsu Inoue, Chiryu; Koji Takahashi, Kariya; Shinji Aoki, Kariya; Hajime Ito, Kariya; Mitsugu Nakamura, Chiryu; Mikio Fukuoka, Bisai; Michiyasu Yamamoto, Chiryu, all of Japan

[73] Assignee: Denso Corporation, Kariya, Japan

[21] Appl. No.: 09/078,048

[22] Filed: May 13, 1998

[30] Foreign Application Priority Data

May 27, 1997 [JP] Japan .................................. 9-136867
Sep. 17, 1997 [JP] Japan .................................. 9-252288
Feb. 3, 1998 [JP] Japan .................................. 10-22336

[51] Int. Cl.$^7$ ....................................................... B60H 1/22
[52] U.S. Cl. .......................... 219/202; 219/486; 392/496; 392/358; 165/41; 165/299
[58] Field of Search ..................................... 219/202, 208, 219/205, 480, 486; 392/495, 496, 482, 358; 165/299, 41, 172–176, 151, 148, 149, 143; 237/28

[56] References Cited

U.S. PATENT DOCUMENTS

| | | | |
|---|---|---|---|
| 1,863,882 | 6/1932 | Scharf | 219/203 |
| 2,019,991 | 11/1935 | Nilson | 219/203 |
| 3,046,380 | 7/1962 | Carlson | 219/486 |
| 3,164,715 | 1/1965 | Cotts | 219/486 |
| 4,141,408 | 2/1979 | Garnett | 219/486 |
| 4,350,287 | 9/1982 | Richards . | |
| 4,459,466 | 7/1984 | Nakagawa et al. . | |
| 4,700,888 | 10/1987 | Samulak | 237/2 A |
| 5,190,096 | 3/1993 | Taniguchi et al. . | |
| 5,279,459 | 1/1994 | Single, II . | |

FOREIGN PATENT DOCUMENTS

| | | |
|---|---|---|
| 1305867 | 11/1961 | France . |
| 2 742 384 | 12/1995 | France . |
| 5-69732 | 3/1993 | Japan . |
| 970355 | 9/1964 | United Kingdom . |
| 989768 | 4/1965 | United Kingdom . |
| 2043235 | 10/1980 | United Kingdom . |

*Primary Examiner*—John A. Jeffery
*Attorney, Agent, or Firm*—Harness, Dickey & Pierce, PLC

[57] ABSTRACT

An air conditioning apparatus includes a heating heat exchanger for heating air blown toward a passenger compartment using hot water as a heating source. A plurality of electric heating members are formed integrally with the heating heat exchanger, and electric power supplied to the electric heating members is controlled according a temperature of the hot water. Therefore, a number of the electric heating members to be operated is finely controlled according to the temperature of water flowing through the heating heat exchanger. Further, when a water temperature of the heating heat exchanger is lower than a predetermined temperature (e.g., 35° C.), a water valve is closed to interrupt the flow of water to the heating heat exchanger, and a blower is operated. Therefore, a quantity of heat transmitted from the electric heating members to the water in the heating heat exchanger can be greatly decreased.

28 Claims, 11 Drawing Sheets

| WATER TEMP. Tw | NUMBER OF EHM |
|---|---|
| Tw < 35 °C | 3 |
| 35 °C ≦ Tw < 55 °C | 2 |
| 55 °C ≦ Tw < 75 °C | 1 |

FIG. 9
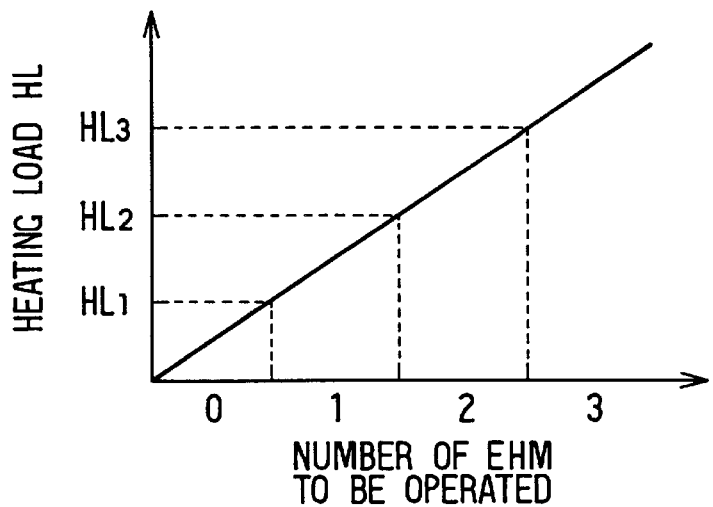
FIG. 10A  FIG. 10B  FIG. 10C
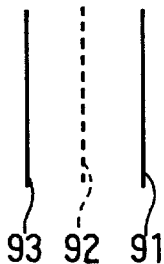 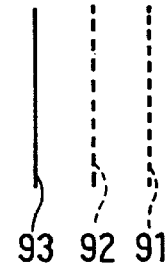 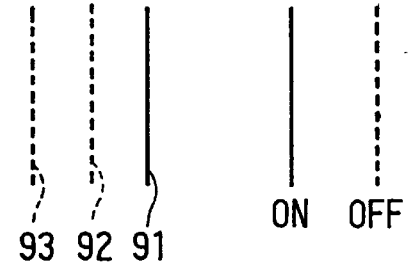
FIG. 11A  FIG. 11B  FIG. 11C
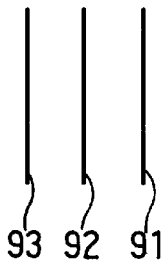 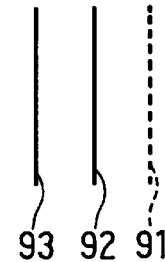 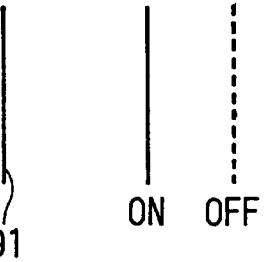

FIG. 13A   FIG. 13B   FIG. 13C
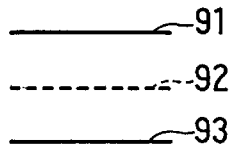 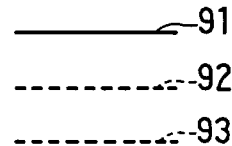 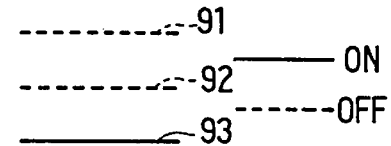
FIG. 14A   FIG. 14B   FIG. 14C
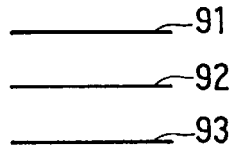 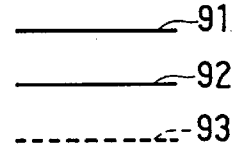 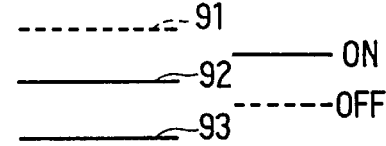
FIG. 15A   FIG. 15B   FIG. 15C
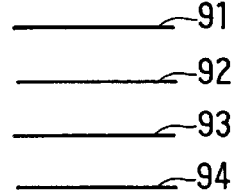 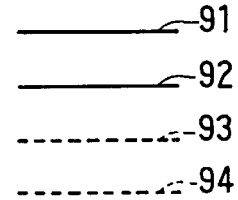 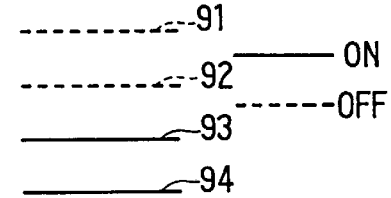

AIR CONDITIONING APPARATUS HAVING ELECTRIC HEATING MEMBER INTEGRATED WITH HEATING HEAT EXCHANGER

CROSS-REFERENCE TO RELATED APPLICATION

This application is related to and claims priorities from Japanese Patent Applications No. Hei. 9-136867 filed on May 27, 1997, No. Hei. 9-252288 filed on Sep. 17, 1997, and No. Hei. 10-22336 filed on Feb. 3, 1998, the contents of which are hereby incorporated by reference.

BACKGROUND OF THE INVENTION

1. Field of the Invention

The present invention relates to an air conditioning apparatus for a vehicle, which includes a heating heat exchanger and electric heating members integrated with the heating heat exchanger. More particularly, the present invention relates to a control unit for electrically controlling the electric heating members.

2. Description of Related Art

In recent years, it is desired to improve an efficiency of an engine in an engine compartment. When the efficiency of the engine is improved, a load of the engine is decreased, and cooling water for cooling the engine can not be sufficiently heated. Therefore, in a hot-water type air conditioning apparatus where air blown toward a passenger compartment is heated using the engine cooling water, there is a problem that heating capacity for the passenger compartment is insufficient.

To overcome the problem, JP-A-5-69732 proposes a hot water type heating heat exchanger integrated with an electric heating member. In the heating heat exchanger, when a temperature of hot water flowing through the heating heat exchanger is lower than a set temperature, electric power is supplied to the electric heating member to heat air using heat generated in the electric heating member. However, in the heating heat exchanger, because electric power supplied to the electric heating member is simply switched according to the temperature of water, the heating capacity for the passenger compartment cannot be controlled finely according to a driving state of a vehicle and the other conditions in the vehicle. Further, because the electric heating member is integrated with the heating heat exchanger, heat generated in the electric heating member is transmitted to the water flowing through the heating heat exchanger when the water has a low temperature; and therefore, air blown toward the passenger compartment cannot be effectively heated by heat generated in the electric heating member.

SUMMARY OF THE INVENTION

In view of the foregoing problems, it is a first object of the present invention to provide an air conditioning apparatus for a vehicle, which can finely control heating capacity of electric heating members according to vehicle conditions such as a driving state of the vehicle and a using state in a passenger compartment.

It is a second object of the present invention to provide an air conditioning apparatus for a vehicle, in which air blown toward a passenger compartment has an uniform temperature distribution by controlling heating capacity of electric heating members.

It is a third object of the present invention to provide an air conditioning apparatus for a vehicle, in which a temperature of air blown toward a left side in a passenger compartment and a temperature of air blown toward a right side in the passenger compartment can be independently controlled by controlling heating capacity of electric heating members.

It is a fourth object of the present invention to provide an air conditioning apparatus for a vehicle, in which a temperature of air blown toward an upper side in a passenger compartment and a temperature of air blown toward a lower side in the passenger compartment can be independently controlled by controlling heating capacity of electric heating members.

It is a fifth embodiment of the present invention to provide an air conditioning apparatus having an electric heating member integrated with a heating heat exchanger, in which a quantity of heat transmitted from the electric heating member to a fluid flowing through the heating heat exchanger is effectively reduced.

According to a first aspect of the present invention, an air conditioning apparatus includes a heating heat exchanger for heating air using a fluid flowing through the heating heat exchanger as a heating source, a plurality of electric heating members for heating air flowing through the air passage, and a control unit for controlling electric power supplied to the electric heating members according to a temperature of the fluid flowing through the heating heat exchanger. The control unit controls the electric heating members in such a manner that the whole electric heating members are turned off when the temperature of the fluid is higher than a first predetermined temperature, and a number of the electric heating members to be turned on is increased as the temperature of the fluid is lowered from the first predetermined temperature. Therefore, according to the temperature of the fluid, heating capacity of the electric heating members is finely controlled. Further, when the temperature of the fluid is higher than the first predetermined temperature, air blown toward the passenger compartment is sufficiently heated by only the heating heat exchanger, and the electric heating members are turned off. Therefore, it can prevent consumption electric power of the electric heating members from being wasted.

Preferably, the electric heating members are disposed in parallel in a left-right direction of a vehicle to have a right side heating member placed at a right side of the vehicle and a left side heating member placed at a left side thereof, and the control unit is controlled to supply electric power only to the right side heating member when the temperature of air blown toward a right side in the passenger compartment is preferentially increased. Further, the control unit is controlled to supply electric power only to the left side heating member when the temperature of air blown toward a left side in the passenger compartment is preferentially increased. Thus, the temperature of air blown toward the left side in the passenger compartment and the temperature of air blown toward the right side in the passenger compartment can be independently controlled by controlling heating capacity of the electric heating members. More further, the control unit is controlled to supply electric power to the right side heating member and the left side heating member symmetrically in the left-right direction of the vehicle, when the temperature of air blown toward the left side in the passenger compartment is set to be equal to the temperature of air blown toward the right side in the passenger compartment. Therefore, air blown toward the passenger compartment has an uniform temperature distribution by controlling heating capacity of the electric heating members.

More preferably, the electric heating members are disposed in parallel in an up-down direction of the vehicle to have an upper side heating member placed at an upper side of the vehicle and a lower side heating member placed at a lower side thereof, the control unit is controlled to supply electric power only to the upper side heating member when the temperature of air blown toward an upper side in the passenger compartment is preferentially increased, and the control unit is controlled to supply electric power only to the lower side heating member when the temperature of air blown toward a lower side in the passenger compartment is preferentially increased. Thus, the temperature of air blown toward the upper side in the passenger compartment and the temperature of air blown toward the lower side in the passenger compartment can be independently controlled by controlling heating capacity of the electric heating members.

According to a second aspect of the present invention, in an air conditioning apparatus, a control unit controls electric power supplied to electric heating members according to heating load calculated by heating load calculation means, in such a manner that the whole electric heating members are turned off when the heating load is lower than a predetermined valve, and a number of the electric heating members to be turned on is increased as the heating load is increased from the predetermined value. Thus, according to the heating load for the passenger compartment, heating capacity of the electric heating members is finely controlled.

According to a third aspect of the present invention, in an air conditioning apparatus having an electric heating member integrated with a heating heat exchanger, a fluid is not supplied to the heating heat exchanger or an amount of the fluid supplied to the heating heat exchanger is reduced while operating the blower, when a temperature of the fluid is lower than a first predetermined temperature during operating the electric heating member. Thus, when the temperature of the fluid is low, heat transmitted from the electric heating member to the fluid in the heating heat exchanger is greatly reduced. As a result, air blown toward the passenger compartment is effectively heated using heat generated in the electric heating member to quickly heat the passenger compartment.

BRIEF DESCRIPTION OF THE DRAWINGS

Additional objects and advantages of the present invention will be more readily apparent from the following detailed description of preferred embodiments when taken together with the accompanying drawings, in which:

FIG. 9 is a graph showing the relationship between a heating load HL and a number of electric heating members to be operated according to the second embodiment;

FIGS. 10A, 10B, 10C are diagrammatic views showing the relationship between a number of electric heating members to be operated and an arrangement position thereof in a left-right side independent control according to a third preferred embodiment of the present invention;

FIGS. 11A, 11B, 11C are diagrammatic views showing the relationship between a number of electric heating members to be operated and an arrangement position thereof in a left-right side independent control according to a fourth preferred embodiment of the present invention;

FIGS. 13A, 13B, 13C are diagrammatic views showing the relationship between a number of electric heating members to be operated and an arrangement position thereof in an upper-lower side independent control according to the fifth embodiment;

FIGS. 14A, 14B, 14C are diagrammatic views showing the relationship between a number of electric heating members to be operated and an arrangement position thereof in an upper-lower side independent control according to a sixth preferred embodiment of the present invention;

FIGS. 15A, 15B, 15C are diagrammatic views showing the relationship between a number of electric heating members to be operated and an arrangement position thereof in an upper-lower side independent control according to a seventh preferred embodiment of the present invention;

DETAILED DESCRIPTION OF THE PRESENTLY PREFERRED EMBODIMENTS

Preferred embodiments of the present invention are described hereinafter with reference to the accompanying drawings.

A first preferred embodiment of the present invention will be now described.

Figure 1:
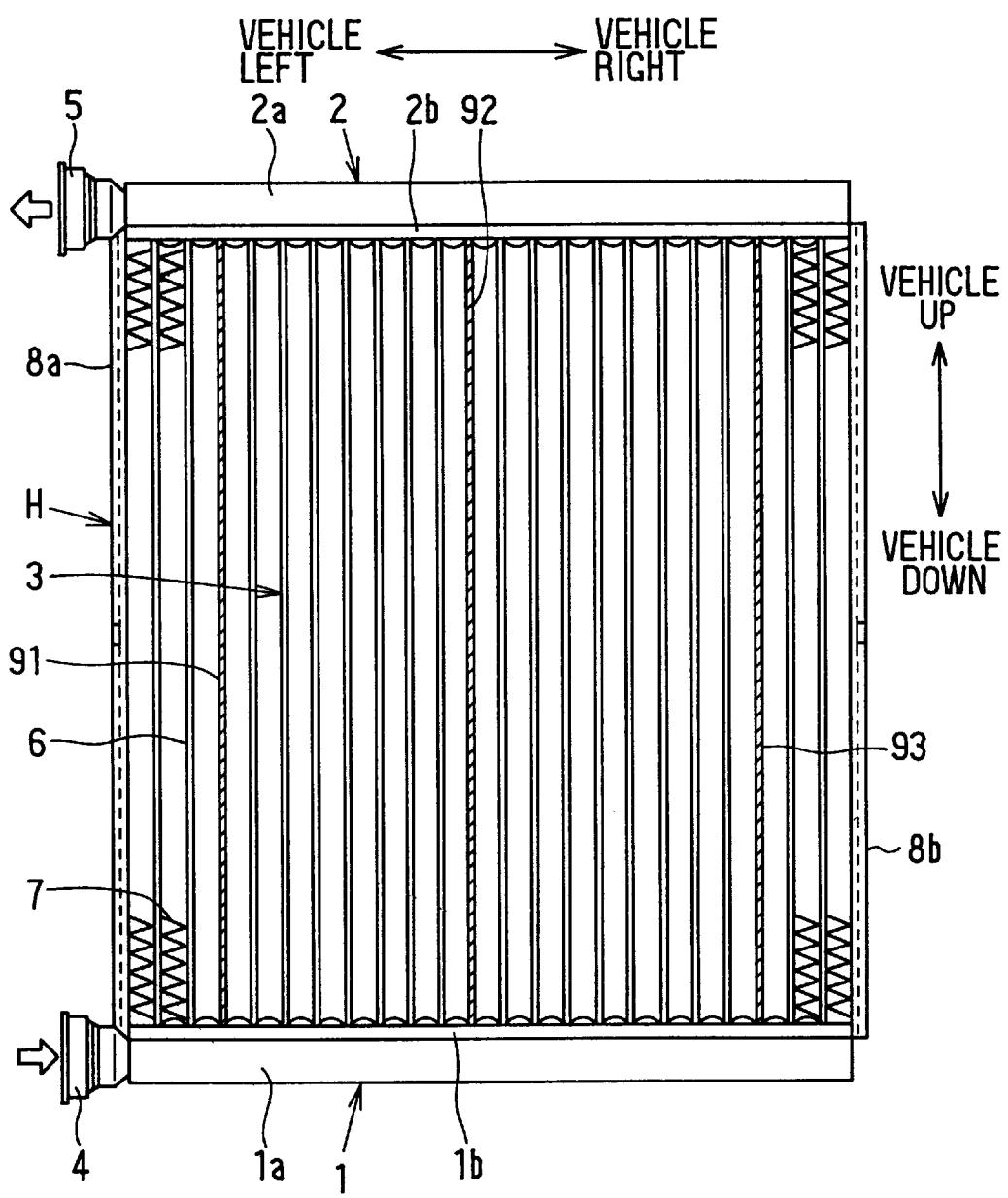
FIG. 1 is a front view showing a heating heat exchanger according to a first preferred embodiment of the present invention.
Figure 2:
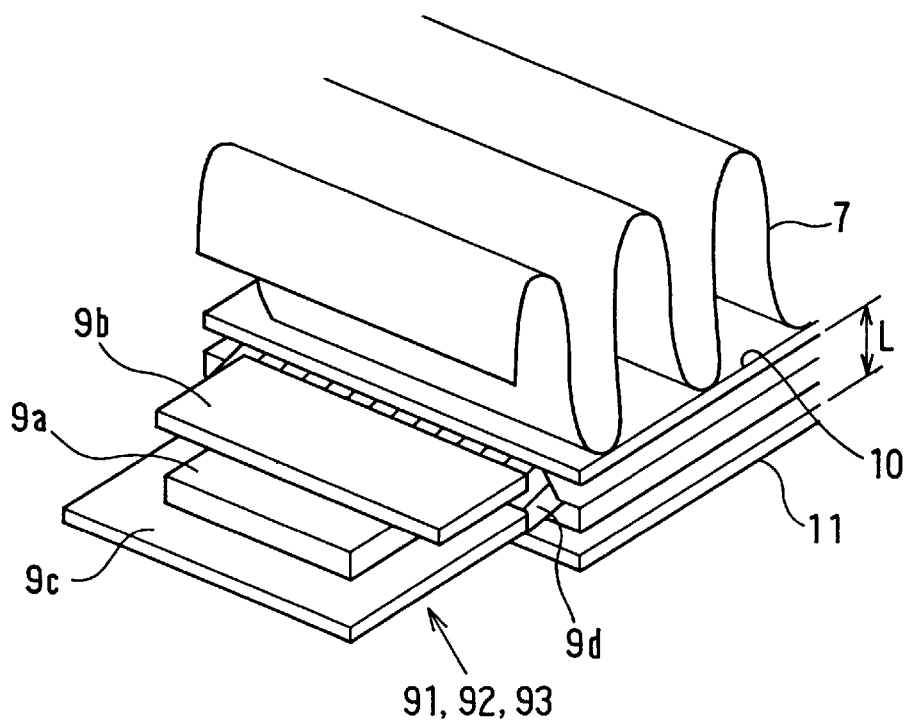
FIG. 2 is a partly enlarged perspective view showing an electric heating member integrated with the heating heat exchanger in FIG. 1.

In the first embodiment, three electric heating members (EHM) are formed integrally with a heating heat exchanger. As shown in FIGS. 1 and 2, a heating heat exchanger H includes a first tank 1 at a hot water inlet side, a second tank 2 at a hot water outlet side, and a core portion 3 disposed between the first and second tanks 1, 2. An inlet pipe 4 through which hot water (i.e., engine cooling water) from an engine 20 (see FIG. 3) of a vehicle flows into the first tank 1 is provided at one side of the first tank 1, and an outlet pipe 5 through which the hot water having been heat exchanged with air returns to the engine 20 is provided at one side of the second tank 2, as shown in FIG. 1. In the first embodiment, the first tank 1 is provided at a lower side of the heating heat exchanger H, and the second tank 2 is provided at an upper side thereof. However, the first tank 1 may be provided at an upper side of the heat exchanger H, and the second tank 2 may be provided at a lower side thereof.

The first tank 1 includes a first tank portion 1*a*, and a first sheet portion 1*b* for closing an opened end of the first tank portion 1*a*. The second tank 2 includes a second tank portion 2*a*, and a second sheet portion 2*b* for closing an opened end of the second tank portion 2*a*. Each of the first and second tanks 1, 2 extends in a left-right direction of the vehicle as shown in FIG. 1. A plurality of tube insertion holes, each of which is formed in a flat-tube shape in cross-section, are provided in each sheet portion 1*b*, 2*b* in series.

The core portion 3 includes a plurality of flat tubes 6 arranged in the left-right direction of the vehicle. Each flat surface of the flat tubes 6 is provided to be parallel to a flow direction (i.e., front-rear direction of the vehicle) of air passing through of the core portion 3. Hot water flows through the flat tubes 6 in one way from a lower side to an upper side in FIG. 1. A corrugated fin 7 formed in a wave shape is connected between each adjacent flat tubes 6. Each corrugated fin 7 has a plurality of louvers which are inclined relative to the flow direction of air passing through the core portion 3 by a predetermined angle. By forming the louvers in each corrugate fin 7, heat-exchanging performance of the core portion 3 is improved. Each both ends of the flat tubes 6 are inserted into the tube insertion holes of the sheet portions 1*b*, 2*b* so that the flat tubes 6 are air-tightly connected to the sheet portions 1*b*, 2*b*. Side plates 8*a*, 8*b* are disposed respectively at left and right sides of the most right corrugate fin 7 and the most left corrugate fin 7 of the core portion 3 to be connected to the most right corrugate fin 7, the most left corrugate fin 7 and the sheet portions 1*b*, 2*b*.

Electric heating members 91, 92, 93 are disposed in the core portion 3, instead of a part of flat tubes 6. As shown in FIG. 1, in the first embodiment, three electric heating members 91, 92, 93 are disposed symmetrically in the left-right direction of the vehicle. That is, a distance between the electric heating members 91, 92 is equal to that between the electric heating members 92, 93 in the left-right direction of the vehicle. As shown in FIG. 2, holding plates 10, 11 extending in the longitudinal direction of the flat tube 6 are connected to adjacent corrugate fins 7 where the electric heating members 91, 92, 93 are provided, and are disposed to have a predetermined distance L therebetween. The distance L corresponds to each thickness of the electric heating member 91, 92, 93, and each electric heating member 91, 92, 93 is inserted between the holding plates 10, 11.

In the first embodiment, the heating heat exchanger H except of the electric heating members 91, 92, 93 is made of aluminum (including aluminum alloy). The electric heating members 91, 92, 93 have the same structure shown in FIG. 2. Each of the electric heating members 91, 92, 93 includes a plate-like heat generating element 9*a*, thin plate-like electrode plates 9*b*, 9*c* disposed at upper and lower sides of the heat generating element 9*a*. That is, the heat generating element 9*a* is inserted between both the electrode plates 9*b*, 9*c* to form a three-layers structure. A cover member 9*d* made of an electric-insulating material is covered around the electrode plates 9*b*, 9*c*. Specifically, the cover member 9*d* is made of an electric-insulating resin having a high heat resistance, such as polyimide resin.

The heat generating element 9*a* is a PTC heater element having positive resistance temperature characteristics in which a value of the resistance thereof increases suddenly at a predetermined temperature, that is, Curie point (e.g., 150° C.). Both the electrode plates 9*b*, 9*c* of the heat generating element 9*a* are made of electrically conductive metal such as aluminum, copper, stainless steel. Each dimension of the electrode plates 9*b*, 9*c* in the longitudinal direction thereof (i.e., a dimension in an up-down direction in FIG. 1) is approximately equal to that of the holding plates 10, 11. By pressing both the electrode plates 9*b*, 9*c* to the heat generating element 9*a*, the electrode plates 9*b*, 9*c* are electrically connected to the heat generating element 9*a*. Further, the cover member 9*d* is pressed by the holding plates 10, 11 so that each electric heating member 91, 92, 93 is assembled between the holding plates 10, 11. In FIG. 2, the upper side electrode plate 9*b* is a positive electrode, and the lower side electrode plate 9*c* is a negative electrode. Terminal portions (not shown), for respectively electrically connecting the electrode plates 9*b*, 9*c* to outside electric control circuits, are formed integrally with the electrode plates 9*b*, 9*c*.

Figure 3:
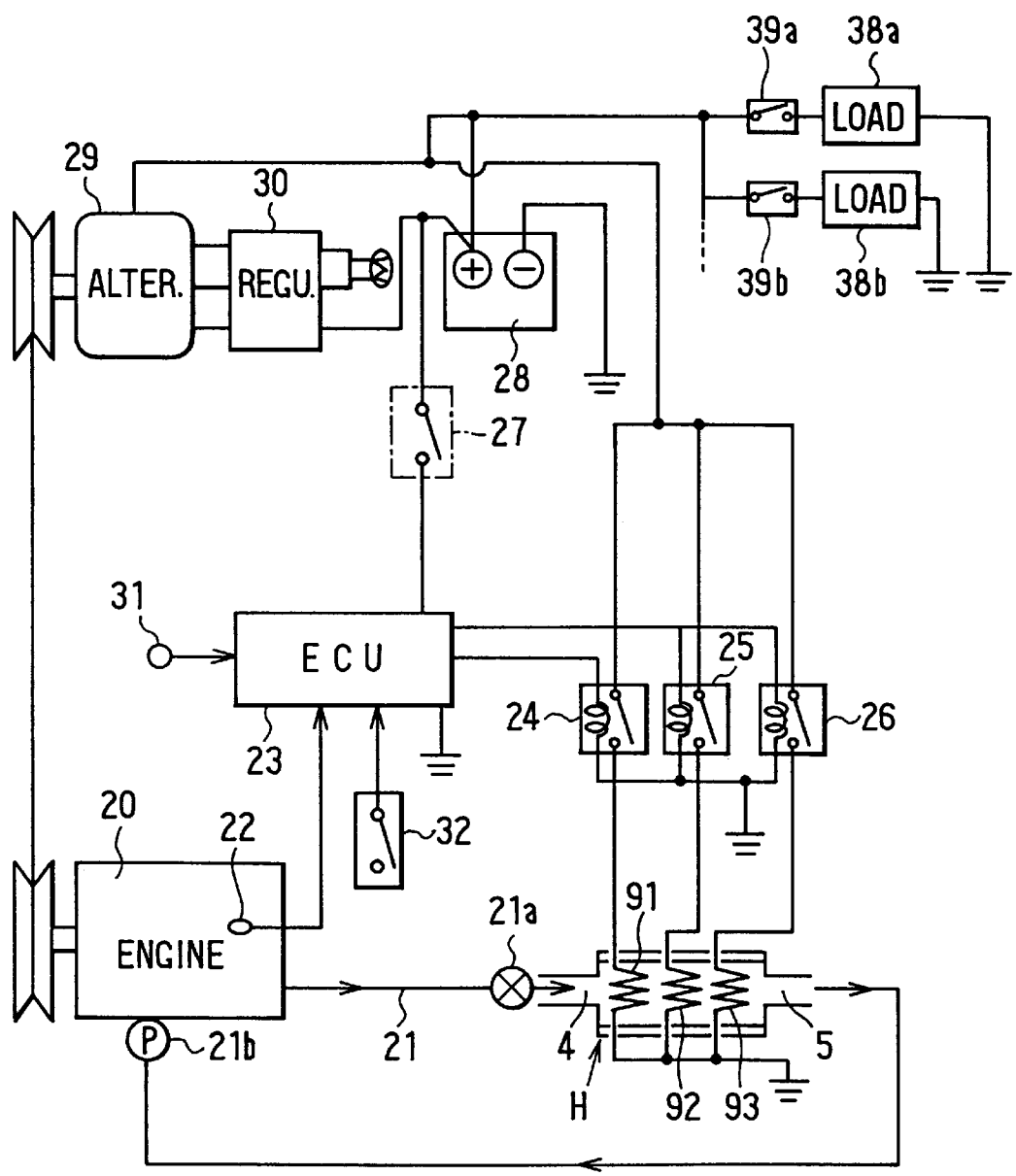
FIG. 3 is a block diagram of an electric control unit of the air conditioning apparatus according to the first embodiment.

As shown in FIG. 3, the outside electric control circuits are respectively electrically connected to the terminal portions integrated with the electrode plates 9*b*, 9*c* of the electric heating members 91, 92, 93. Electric power from a battery 28 in the vehicle is supplied to the electric heating members 91, 92, 93 through the outside electric control circuits. The three electric heating members 91, 92, 93 are respectively electrically connected to the battery 28 in parallel.

Electric power supplied to the electric heating members 91, 92, 93 is controlled as shown in FIG. 3. Cooling water (hot water, warm water) circulates between an engine 20 of the vehicle and the heating heat exchanger H through a hot water circuit 21. The hot water circuit 21 includes a hot water valve 21*a* for adjusting a flow of hot water supplied to the heating heat exchanger H, and a water pump 21*b* for circulating the hot water.

A temperature of hot water in the engine 20 of the vehicle is detected by a water temperature sensor 22, and a water temperature detected by the water temperature sensor 22 is input to an electronic control unit (hereinafter referred to as "ECU") 23. The ECU 23 includes a microcomputer, and controls electric current to be supplied to the electric heating members 91, 92, 93 according to pre-set program thereof. Signals from the ECU 23 are output to three relays 24, 25, 26, and electric power supplied to the electric heating members 91, 92, 93 is switched by the relays 24, 25, 26.

Electric power from the battery 28 of the vehicle is supplied to the ECU 23 through an ignition switch 27 which switches the operation of the ECU 23. The battery 28 is charged by an alternator 29, and an output voltage of the alternator 29 is adjusted by a regulator 30.

Figure 4:
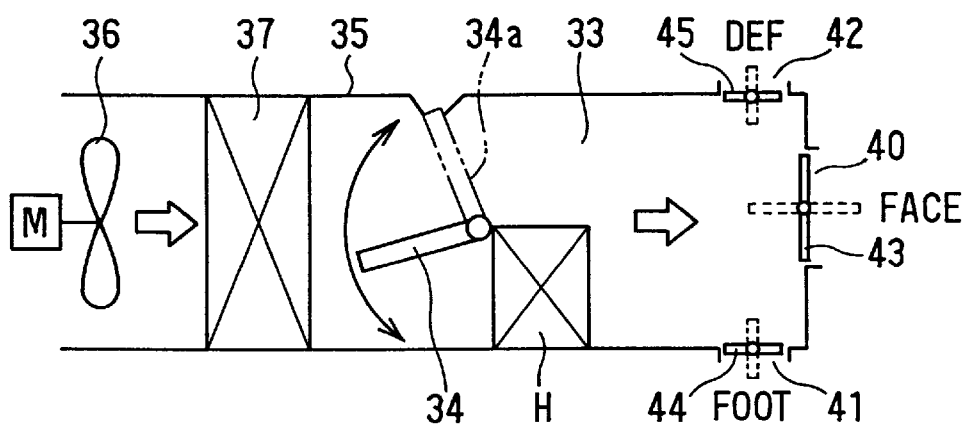
FIG. 4 is a schematic diagram showing a ventilation system of an air conditioning apparatus according to the first embodiment.

On the other hand, signals from an outside air temperature sensor 31 and a maximum heating mode switch 32 are input to the ECU 23. When the maximum heating mode is set in the air conditioning apparatus, the maximum heating mode switch 32 is turned on. That is, the maximum heating mode switch is operated according to a state whether or not the maximum heating mode is set in the air conditioning apparatus. When an air mixing type door is used in the air conditioning apparatus to control a temperature of air blown toward the passenger compartment as shown in FIG. 4, an amount of air passing through the heating heat exchanger H and an amount of air passing through a bypass passage 33 of the heating heat exchanger H are adjusted by an air mixing door 34. When the air mixing door 34 is operated at a chain line position 34a in FIG. 4 to fully close the bypass passage 33 and to fully open the heating heat exchanger H, the maximum heating switch 32 is turned ON.

As shown in FIG. 4, the air conditioning apparatus includes an air conditioning case 35 for forming an air passage, a blower 36 for blowing air toward the heating heat exchanger H in the air conditioning case 35, and a cooling heat exchanger (i.e., evaporator) 37 for cooling air passing therethrough. The air conditioning case 35 includes a face air outlet 40 for blowing air toward the upper side of a passenger in the passenger compartment, a foot air outlet 41 for blowing air toward the foot area of the passenger in the passenger compartment, a defroster air outlet 42 for blowing air toward an inner surface of a windshield of the vehicle. The face air outlet 40, the foot air outlet 41 and the defroster air outlet 42 are respectively opened and closed by air outlet mode doors 43–45.

The heating heat exchanger H is disposed in the air conditioning case 35 to correspond to the positions in the up-down direction and in the left-right direction in FIG. 1. Therefore, the three electric heating members 91, 92, 93 are disposed in the air conditioning case 35 in parallel in the left-right direction in FIG. 4. The center electric heating member 92 is placed at a center position between the two electric heating members 91, 93 in the left-right direction in FIG. 4. That is, within the air conditioning case 35, the three electric heating members 91–93 are disposed symmetrically in the left-right direction in FIG. 5. Loads 38a, 38b are electric loads which operate the battery 28 through operation switches 39a, 39b.

When heating operation is performed for the passenger compartment, the blower 36 shown in FIG. 4 is operated, and air passes through between the flat tubes 6 and the corrugated fins 7. On the other hand, the water pump 21b of the engine 20 is operated so that hot water from the engine 20 flows into the first tank 1 from the inlet pipe 4. The hot water in the first tank 1 is distributed into the flat tubes 6. Therefore, air passing through the core portion 3 is heated by the hot water flowing through the flat tubes 6. The hot water having passed through the flat tubes 6 flows into the second tank 2, and flows toward the outside from the outlet pipe 5 to returns to the engine 20.

In the heating operation, when heat generated in the electric heating members 91–93 is necessary, the relays 24–26 are turned on, and electric power is supplied from the battery 28 to the electric heating members 91–93. Therefore, electric power is supplied to the heat generating element 9a through the electrode plates 9b, 9c in each electric heating member 91–93. Heat generated in the heat generating element 9a is transmitted to corrugated fins 7 provided two sides of each electric heating members 91–93 through the electrode plates 9b, 9c, the cover member 9d and the holding plates 10, 11. Therefore, when hot water flowing through the heating heat exchanger H has a low temperature, air blown toward the passenger compartment can be readily quickly heated using the electric heating members 91–93.

Because the heat generating element 9a in each electric heating member 91–93 is the PTC element having positive resistance temperature characteristics in which the resistance value increases suddenly at the Curie point, the generated heat of the heat generating element 9a can be controlled by itself at the Curie point.

In the first embodiment, the number of the electric heating members 91–93, to which electric power is supplied, is controlled according to the temperature of hot water of the engine 20. That is, the number of the electric heating members 91–93 to be operated (i.e., to be turned on) is adjusted based on the temperature of hot water.

Figures 5, 6:
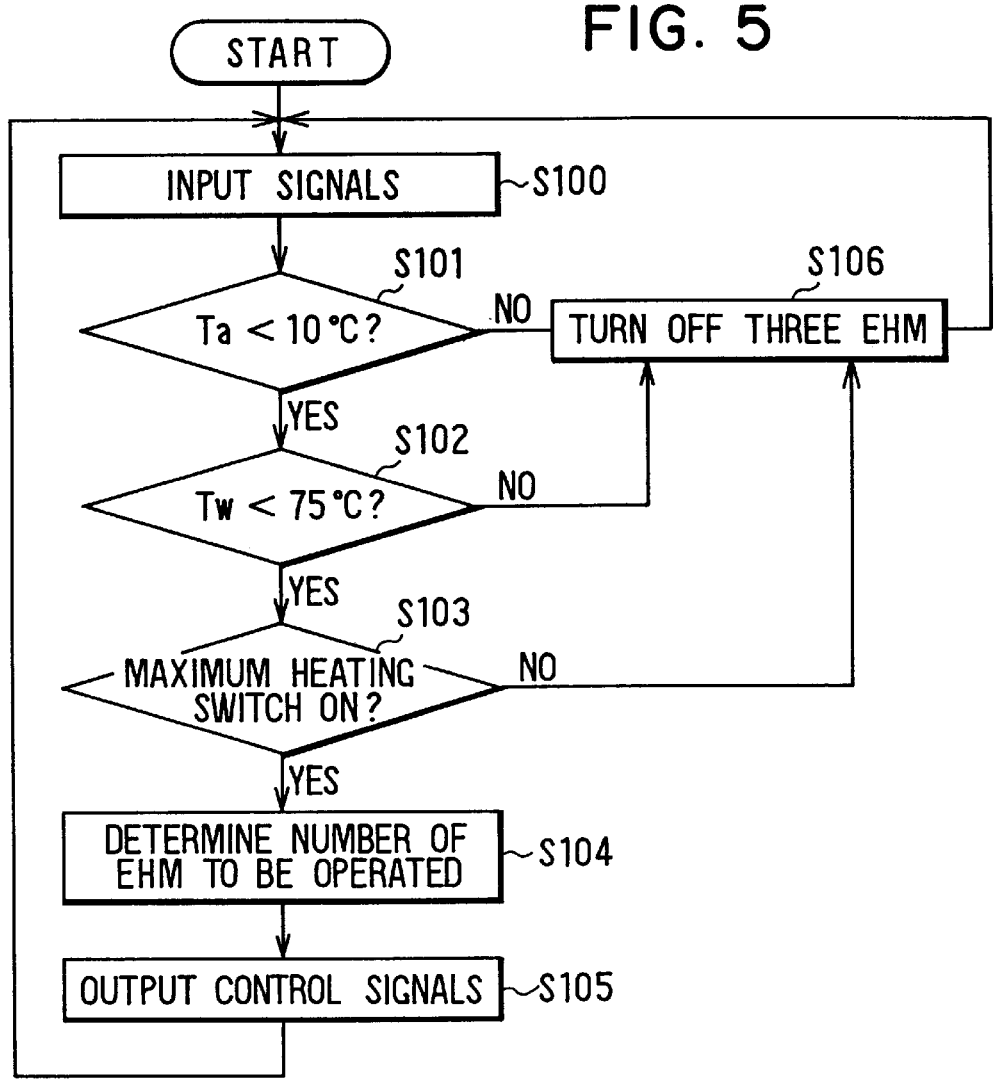
FIG. 5 is a flow chart showing an electric control of the electric control unit according to the first embodiment.
FIG. 6 is a view showing the relationship between a water temperature Tw and a number of the electric heating members to be operated according to the first embodiment.

Next, an electric control of the electric heating members 91, 92, 93 will be described with reference FIG. 5. When the ignition switch 27 and an air conditioning operation switch (not shown) are turned on, a control routine shown in FIG. 5 starts. At step S100, signals from sensors and switches and the like are input. At step S101, it is determined whether or not an outside air temperature Ta detected by the outside air temperature sensor 31 is lower than a set temperature (e.g., 10° C.). That is, at step S101, it is determined whether or not the heating operation is necessary in the passenger compartment. Therefore, the set temperature is generally set at a low temperature (e.g., 10° C.). When the outside air temperature Ta is lower than 10° C., it is determined whether or not a water temperature Tw detected by the water temperature sensor 22 is lower than a set temperature (e.g., 75° C.).

When the water temperature Tw is lower than 75° C., it is determined whether or not the maximum heating switch 32 is turned on at next step S103. That is, at step S103, it is determined whether or not the air mixing door 34 is placed at the maximum heating state (i.e., the chain line position 34a). When the maximum heating switch 32 is turned on, the number of electric heating members (EHM), to which electric power is supplied, is determined according to the water temperature Tw at step S104. That is, at step S104, the number of the electric heating members to be operated is determined. In the first embodiment, the program shown in FIG. 6 is pre-stored in a ROM of the microcomputer. As shown in FIG. 6, when the water temperature Tw is lower than 35° C. (Tw<35° C.), electric power is supplied to three electric heating members (EHM). When the water temperature Tw is in a range of 35° C.≦Tw<55° C., electric power is supplied to two electric heating members. When the water temperature Tw is in a range of 55° C.<Tw<75° C., electric power is supplied to a single electric heating member. Next, at step S105, a control signal corresponding to the number of the electric heating members to be operated is output to the relays 24–26, and electric power is supplied to a predetermined number of the electric heating members 91–93 by switching the relays 24–26. As described above, because the number of the electric heating members to be operated is finely controlled according to the water temperature Tw, it can prevent electric power supplied to the electric heating members 91–93 from be wasted.

On the other hand, when the outside air temperature Ta is not lower than 10° C. at step S101, the hot water temperature Tw is not lower than 75° C. at step S102, or the maximum heating state is not set (i.e., the air mixing door 34 is not placed at the maximum heating position 34a), electric power supplied to the three electric heating members 91–93 is interrupted to prevent electric power from being wasted.

In the first embodiment, a charged state (i.e., charged level) of the battery 28 can be detected by a battery detection unit such as a battery voltage detection sensor, and an operational number of the electric heating members may be determined according to the changed state of the battery 28. In a range of the operational number of the electric heating members 91–93, the number of the electric heating members to be operated is further determined according to the water temperature Tw. Thus, an over discharge of the battery 28 is prevented when electric power is supplied to the electric heating members 91–93.

Figures 7A, 7B, 7C:
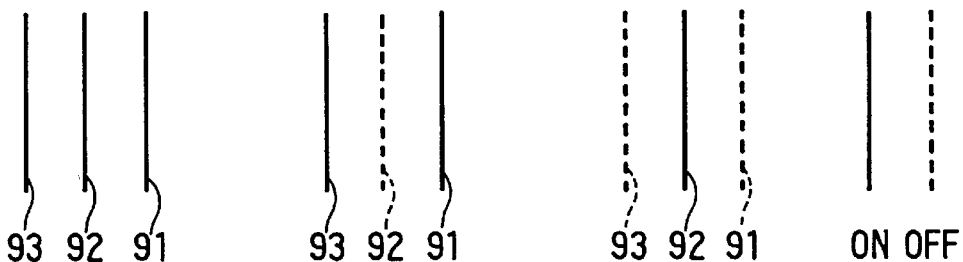
FIGS. 7A, 7B, 7C are diagrammatic views showing the relationship between the number of the electric heating members to be operated and an arrangement position thereof according to the first embodiment.

FIGS. 7A, 7B, 7C show electric-power supplied positions of the electric heating members 91–93. In FIGS. 7A, 7B, 7C, a solid line indicates an electric heating member 91, 92, 93 to which electric power is supplied, and a chain line indicates an electric heating member 91, 92, 93 to which electric power is not supplied. FIG. 7A shows a state where electric power is supplied to three electric heating members 91–93, FIG. 7B shows a state where electric power is supplied to left and right two electric heating members 91, 93, and FIG. 7C shows a state where electric power is supplied to only a center electric heating member 92. By switching the electric heating members 91–93 as described above, electric power can be supplied to the electric heating members 91–93 symmetrically in the left and right sides of the heating heat exchanger H. Thus, in any one case shown in FIGS. 7A, 7B, 7C, air blown from the heating heat exchanger H is heated symmetrically in the left-right direction of the vehicle. As a result, air blown toward the left and right sides (i.e., driver's seat side and front passenger's seat side next to the driver's seat) in the passenger compartment has an uniform temperature distribution.

A second preferred embodiment of the present invention will be now described.

In the second embodiment, the structure of the air conditioning apparatus is similar to that in the first embodiment. Therefore, the explanation about the same portions as that in the first embodiment is omitted, and only different portions different from that in the first embodiment will be now described. That is, in the above-described first embodiment, the number of the electric heating members 91–93 to be operated is determined according to the water temperature Tw. However, in the second embodiment, a heating load HL is calculated, and the number of the electric heating members 91–93 to be operated is determined according to the calculated heating load HL as shown in FIG. 8.

Figure 8:
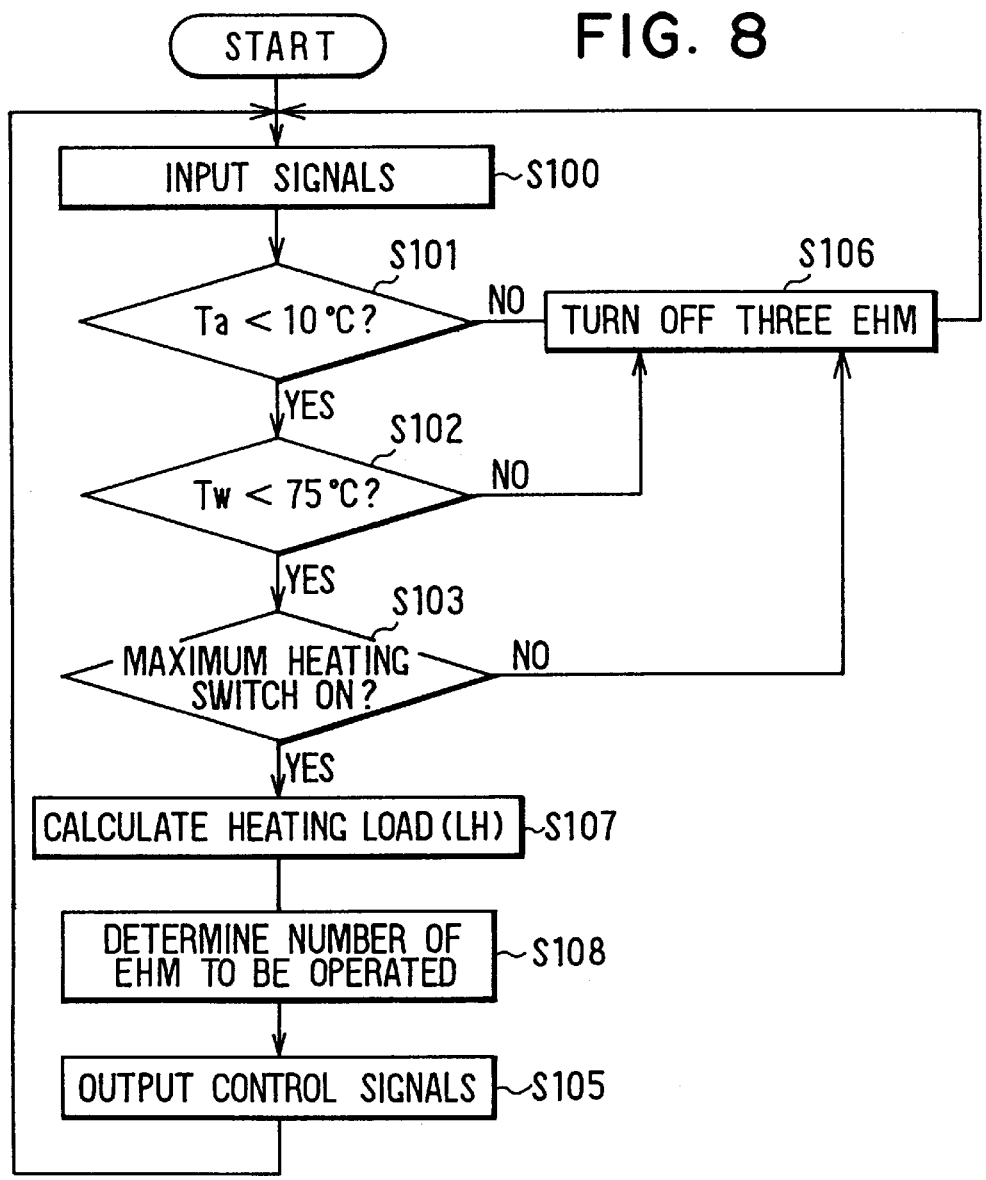
FIG. 8 is a flow chart showing an electric control of an electric control unit according to a second preferred embodiment of the present invention.

As shown in FIG. 8, at step S107, the heating load HL is calculated based on an air conditioning set temperature set by a passenger in the passenger compartment, the outside air temperature Ta detected by the outside air temperature sensor 22 and the inside air temperature Tr (i.e., temperature inside the passenger compartment) detected by an inside air temperature sensor (not shown). The heating load HL corresponds to a quantity of heat required to heat the passenger compartment until the set temperature Tset. The higher the set temperature Tset is, the higher the heating load HL becomes. Further, the lower the outside air temperature or the inside air temperature is, the higher the heating load HL becomes.

Next, at step S108, the number of electric heating members 91–93 is determined according to a pre-set program shown in FIG. 9. That is, when the heating load HL is lower than a first heating load $HL_1$ (i.e., $LH<LH_1$), the number of the electric heating members 91–93 to be operated is set at zero. When the heating load HL is in a range between the first heating load $HL_1$ and a second heating load $HL_2$ (i.e., $HL_1 \leq HL < HL_2$), the number of the electric heating members 91–93 to be operated is set at 1. When the heating load HL is in a range between the second heating load $HL_2$ and a third heating load $HL_3$ (i.e., $HL_2 \leq HL < HL_3$), the number of the electric heating members 91–93 to be operated is set at 2. When the heating load HL is not lower than the third heating load $HL_3$ (i.e., $HL>HL_3$), the number of the electric heating members 91–93 to be operated is set at 3.

In the second embodiment, similarly to the first embodiment, the number of the electric heating members 91–93 may be preferentially determined according to the battery charging state to prevent the over discharge of the battery.

A third preferred embodiment of the present invention will be now described with reference FIGS. 10A–10C.

In the third embodiment, similarly to the first embodiment the three electric heating members 91–93 are integrated with the heating heat exchanger H as shown in FIG. 1, and the electric heating members 91–93 are arranged in the left-right direction of the vehicle. Therefore, by electrically switching the electric heating members 91–93, a temperature of air blown toward a right side (e.g., driver's seat side) in the passenger compartment and a temperature of air blown toward a left side (e.g., front passenger's seat side next to the driver's seat) in the passenger compartment can be independently controlled.

In an air conditioning apparatus where the temperature of air blown toward the right side in the passenger compartment and the temperature of air blown toward the left side in the passenger compartment can be independently controlled, there are provided with two temperature setting units for independently setting the temperature at right and left sides in the passenger compartment, a partition member for partitioning the air passage in the air conditioning case 35 into a right side passage and a left side passage, and two temperature adjustment members for independently controlling the temperature of air flowing through the right side air passage and the temperature of air flowing through the left side air passage. In the air conditioning apparatus, the two temperature adjustment members are independently operated according to set temperatures of the two temperature setting units; and therefore, the temperature of air blown toward the right side in the passenger compartment and the temperature of air blown toward the left side in the passenger compartment can be independently controlled. In this type air conditioning apparatus, when a target temperature of air blown toward the left side in the passenger compartment is equal to a target temperature of air blown toward the right side in the passenger compartment, electric power is supplied to the left and right electric heating members 91, 93 as shown in FIG. 10A; and therefore, a temperature difference is not caused by the generated heat of the electric heating members 91, 93.

When the target temperature of air blown toward the left side in the passenger compartment is higher than the target temperature of air blown toward the right side in the passenger compartment, electric power is supplied only to the left electric heating member 93 as shown in FIG. 10B; and therefore, the temperature of air blown toward the left side in the passenger compartment is made higher than the temperature of air blown toward the right side in the passenger compartment.

When the target temperature of air blown toward the left side in the passenger compartment is lower than the target temperature of air blown toward the right side in the passenger compartment, electric power is supplied only to the right electric heating member 91 as shown in FIG. 10C; and therefore, the temperature of air blown toward the left side in the passenger compartment is made lower than the temperature of air blown toward the right side in the passenger compartment.

As described above, in the third embodiment, the temperature of air blown toward the left side in the passenger compartment and the temperature of air blown toward the right side in the passenger compartment is independently controlled according to the set; temperatures at the left and right sides in the passenger compartment. However, the temperature of air blown toward the left side in the passenger compartment and the temperature of air blown toward the right side in the passenger compartment may be independently controlled according to the other conditions such as a difference of sunlight amount at left and right sides in the passenger compartment.

A fourth preferred embodiment of the present invention will be now described with reference to FIGS. 11A–11C.

The fourth embodiment is a modification of the third embodiment. In the fourth embodiment, when a target temperature of air blown toward the left side in the passenger compartment is equal to a target temperature of air blown toward the right side in the passenger compartment, electric power is supplied to the three electric heating members 91–93 as shown in FIG. 11A; and therefore, a temperature difference is not caused by the generated heat of the electric heating members 91–93.

When the target temperature of air blown toward the left side in the passenger compartment is higher than the target temperature of air blown toward the right side in the passenger compartment, electric power is supplied to the left and center electric heating members 92, 93 as shown in FIG. 11B; and therefore, the temperature of air blown toward the left side in the passenger compartment is made higher than the temperature of air blown toward the right side in the passenger compartment.

When the target temperature of air blown toward the left side in the passenger compartment is lower than the target temperature of air blown toward the right side in the passenger compartment, electric power is supplied to the right and center electric heating members 91, 92 as shown in FIG. 11C; and therefore, the temperature of air blown toward the left side in the passenger compartment is made lower than the temperature of air blown toward the right side in the passenger compartment. In the fourth embodiment, even by electrically switching the electric heating members 91–93 as shown in FIGS. 11A–11C, the temperature of air blown toward the left side in the passenger compartment and the temperature of air blown toward the right side in the passenger compartment can be independently controlled, similarly to the third embodiment.

A fifth preferred embodiment of the present invention will be now described with reference to FIGS. 12, 13A–13C.

Figure 12:
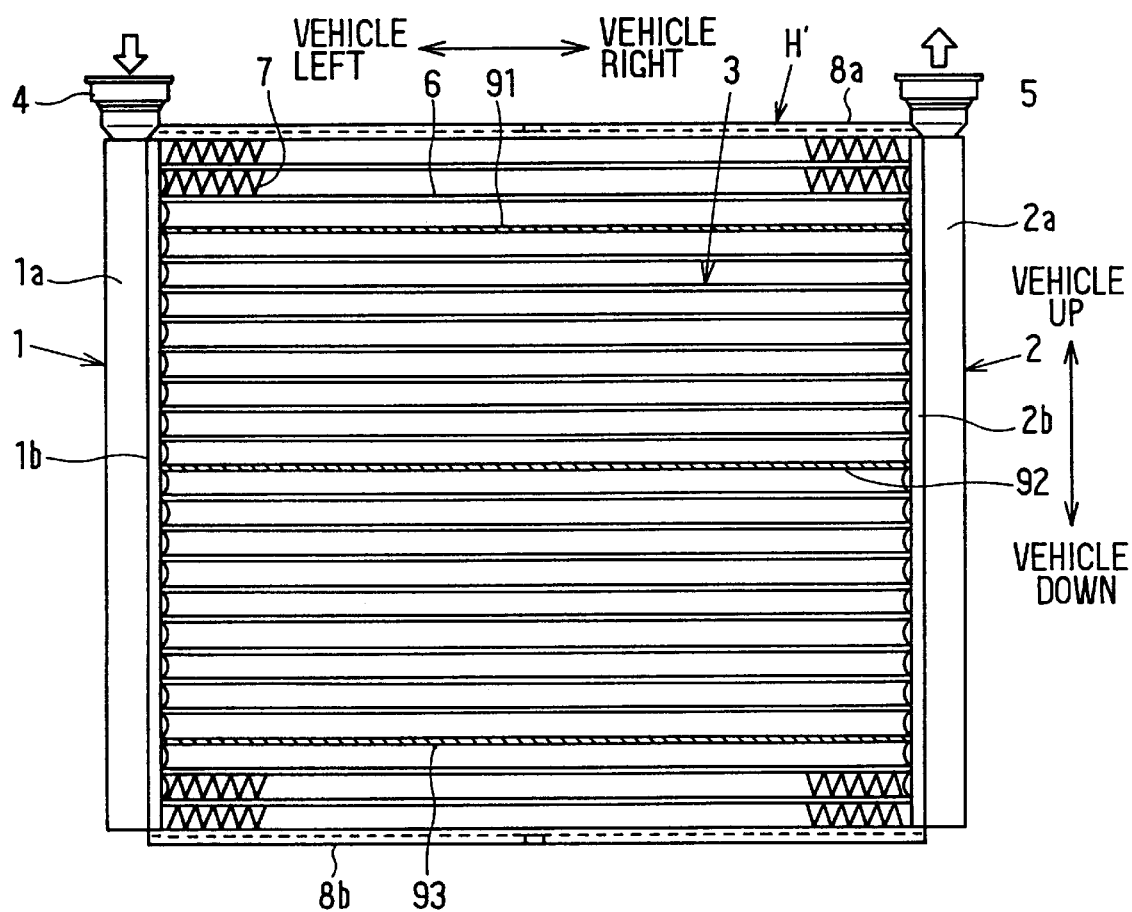
FIG. 12 is a front view showing a heating heat exchanger according to a fifth preferred embodiment of the present invention.

In the fifth embodiment, the three electric heating members 91–93 are integrated with a heating heat exchanger H', and the heating heat exchanger H' is disposed in the air conditioning apparatus of the vehicle in such a manner that electric heating members 91–93 are arranged in the up-down direction of the vehicle in parallel, as shown in FIG. 12. Therefore, in the air conditioning apparatus, by electrically switching the electric heating members 91–93, the temperature of air blown toward an upper side in the passenger compartment and the temperature of air blown toward a lower side in the passenger compartment can be independently controlled. Thus, in the bi-level mode where conditioned air is blown toward both the upper and lower sides in the passenger compartment, the temperature of air blown from the face air outlet 40 (see FIG. 4) and the temperature of air blown from the foot air outlet 41 (see FIG. 4) can be independently controlled.

To independently control the temperature of air blown toward the upper side in the passenger compartment and the temperature of air blown toward the lower side in the passenger compartment, a cool air bypass passage (not shown) for directly introducing cool air having passed through the cooling heat exchanger 37 to the face air outlet 40 is provided, and the amount of cool air passing through the cool air bypass passage is adjusted by a cool air bypass door. In this type air conditioning apparatus, when a target temperature of air blown toward the upper side in the passenger compartment is equal to a target temperature of air blown toward the lower side in the passenger compartment, electric power is supplied to the upper and lower electric heating members 91, 93 as shown in FIG. 13A; and therefore, a temperature difference is not caused by the generated heat of the electric heating members 91, 93.

When the target temperature of air blown toward the upper side in the passenger compartment is higher than the target temperature of air blown toward the lower side in the passenger compartment, electric power is supplied to only the upper electric heating member 91 as shown in FIG. 13B; and therefore, the temperature of air blown toward the upper side in the passenger compartment is made higher than the temperature of air blown toward the lower side in the passenger compartment.

When the target temperature of air blown toward the upper side in the passenger compartment is lower than the target temperature of air blown toward the lower side in the passenger compartment, electric power is supplied to only the lower electric heating member 93 as shown in FIG. 13C; and therefore, the temperature of air blown toward the upper side in the passenger compartment is made lower than the temperature of air blown toward the lower side in the passenger compartment.

A sixth preferred embodiment of the present invention will be now described with reference to FIGS. 14A–14C.

The sixth embodiment is a modification of the fifth embodiment. In the sixth embodiment, when a target temperature of air blown toward the upper side in the passenger compartment is equal to a target temperature of air blown toward the lower side in the passenger compartment, electric power is supplied to the three electric heating members 91–93 as shown in FIG. 14A; and therefore, a temperature difference is not caused between the upper and lower sides in the passenger compartment by the generated heat of the electric heating members 91, 93.

When the target temperature of air blown toward the upper side in the passenger compartment is higher than the target temperature of air blown toward the lower side in the passenger compartment, electric power is supplied to the upper and center electric heating members 91, 92 as shown in FIG. 14B; and therefore, the temperature of air blown toward the upper side in the passenger compartment is made higher than the temperature of air blown toward the lower side in the passenger compartment.

When the target temperature of air blown toward the upper side in the passenger compartment is lower than the target temperature of air blown toward the lower side in the passenger compartment, electric power is supplied to the lower and center electric heating members 92, 93 as shown in FIG. 14C; and therefore, the temperature of air blown toward the upper side in the passenger compartment is made lower than the temperature of air blown toward the lower side in the passenger compartment.

A seventh preferred embodiment of the present invention will be described with reference to FIG. 15.

The seventh embodiment is a modification of the fifth embodiment. In the seventh embodiment, four electric heating members 91–94 are integrated with a heating heat exchanger H'', and the four electric heating members 91–94 are arranged in the up-down direction of the vehicle in parallel. In this case, when the target temperature of air blown toward the upper side in the passenger compartment is equal to the target temperature of air blown toward the lower side in the passenger compartment, electric power is supplied to the four electric heating members 91–94 as shown in FIG. 15A; and therefore, a temperature difference is not caused by the generated heat of the electric heating members 91–94.

When the target temperature of air blown toward the upper side in the passenger compartment is higher than the target temperature of air blown toward the lower side in the passenger compartment, electric power is supplied to the upper electric heating members 91, 92 as shown in FIG. 15B; and therefore, the temperature of air blown toward the upper side in the passenger compartment is made higher than the temperature of air blown toward the lower side in the passenger compartment.

When the target temperature of air blown toward the upper side in the passenger compartment is lower than the target temperature of air blown toward the lower side in the passenger compartment, electric power is supplied to the lower electric heating members 93, 94 as shown in FIG. 15C; and therefore, the temperature of air blown toward the upper side in the passenger compartment is made lower than the temperature of air blown toward the lower side in the passenger compartment.

An eighth preferred embodiment of the present invention will be described with reference to FIGS. 16–18, 19A–19D.

Figure 16:
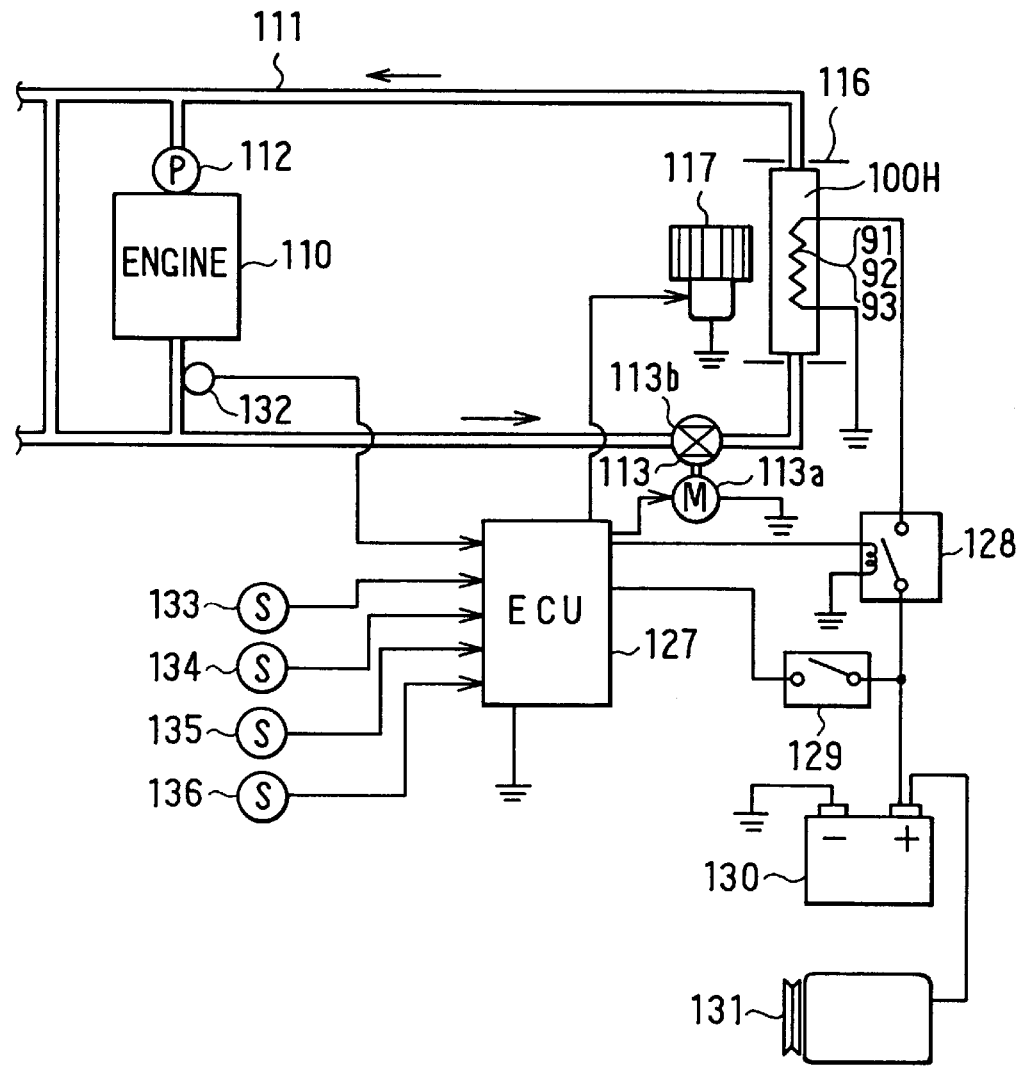
FIG. 16 is a block view showing a water circuit of a heating heat exchanger and an electric control unit of an air conditioning apparatus according to an eighth preferred embodiment of the present invention.

In the eighth embodiment, the structure of an air conditioning apparatus is similar to that in the first embodiment. As shown in FIG. 16, a water pump 112 driven by an engine 110 of the vehicle is provided in a water circuit 111, and hot water circulates in the water circuit 111 by operating the water pump 12. Hot water heated in the engine 110 flows into a heating heat exchanger 100H through a hot water valve 113. The hot water valve 113 includes an electric actuator 113a such as a servomotor, and a valve body 13b driven by the electric actuator 113a to adjust an opening degree of a water passage. Further, electric heating members 91–93 are integrated with the heating heat exchanger 100H, similarly to the first embodiment. The heating heat exchanger 100H is contained in an air conditioning case 116, and heats air passing there-through using hot water or the electric heating members 91–93 as heating source. The heating heat exchanger 100H including the electric heating members 91–93 has a structure similar to that in the first embodiment, and the explanation thereof is omitted.

Next, an electric control of the three electric heating members 91–93 will be now described. An electronic control unit (ECU) 127 includes a microcomputer, and controls the electric heating members 91–93 based on a pre-set program. Signals from the ECU 127 are output to a relay 128. In FIG. 16, only the single relay 128 is indicated. However, actually, three relays are provided to correspond to the three electric heating members 91–93. An ignition switch 129 for switching an operation of the engine 110 is provided, and electric power from a battery 130 of the vehicle is supplied to the ECU 127 through the ignition switch 129. An alternator 131 is connected to the battery 130, and the battery 130 is charged by the alternator 131. Signals from a water temperature sensor 132 for detecting a temperature of hot water in the engine 110, an outside air temperature sensor 133 for detecting an outside air temperature Ta, a battery voltage sensor 134 for detecting a voltage charged in the battery 130, a maximum heating switch 135 for setting the maximum heating mode and an air conditioning operation switch 136 are input to the ECU 127.

Figure 17:
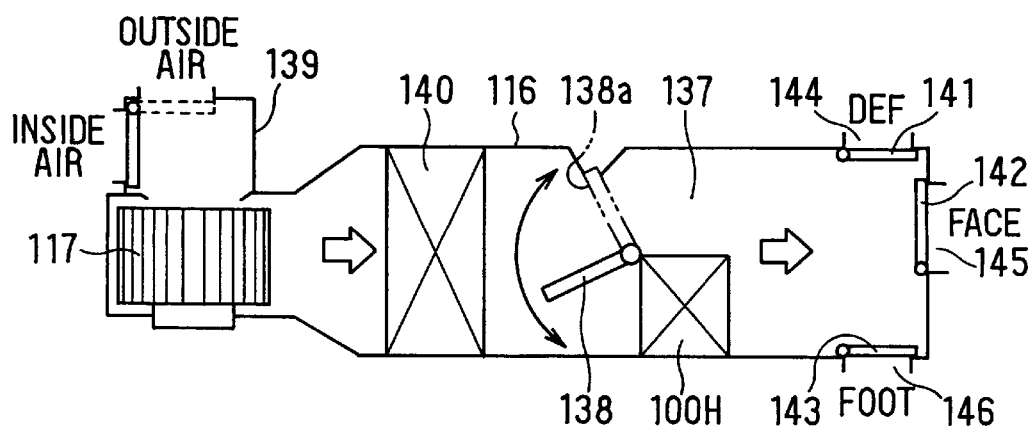
FIG. 17 is a schematic diagram showing a ventilation system of the air conditioning apparatus according to the eighth embodiment.

As shown in FIG. 17, the air conditioning apparatus includes an air conditioning case 116 for forming an air passage, an inside/outside air switching box 139 for introducing inside air and outside air, a blower 117 for blowing air introduced from the inside/outside air switching box 139 into the air conditioning case 116, a cooling heat exchanger 140 (i.e., evaporator) for cooling air passing therethrough, and the heating heat exchanger 100H disposed at a downstream air side of the cooling heat exchanger 140. The heating heat exchanger 100H is disposed to form a bypass passage 137, and an amount of air passing through the bypass passage 137 and an amount of air passing through the heating heat exchanger 100H are adjusted by an air mixing door 138. The air conditioning case 116 includes a defroster opening 144 for blowing air toward an inner surface of a windshield, a face opening 45 for blowing air toward an upper side in the passenger compartment, and a foot opening 46 for blowing air toward a lower side in the passenger compartment. The defroster opening 11, the face opening 45 and the foot opening 46 are opened and closed by air outlet mode selecting doors 141–143, respectively.

In the eighth embodiment, when the temperature of hot water is lower than a predetermined temperature in a heating mode, the relay 128 is turned on so that electric power is supplied from the buttery 130 to the electric heating members 91–93. Therefore, the electric heating members 91–93 generate heat, and the generated heat is transmitted to corrugated fins placed at two sides of each electric heating members 91–93 to heat air passing through the corrugated fins. Thus, even when the temperature of hot water is low, air blown toward the passenger compartment can be quickly heated in the heating mode. However, heat generated in the electric heating members 91–93 can be transmitted to water in flat tubes through the corrugated fins and the flat tubes when the temperature of water flowing through the flat tubes is low. When the amount of heat transmitted from the electric heating members 91–93 to the water is increased, heat generated in the electric heating members 91–93 is not effectively used for heating air blown toward the passenger compartment; and therefore, heating performance of the electric heating members 91–93, for rapidly heating the passenger compartment, is decreased.

Figure 18:
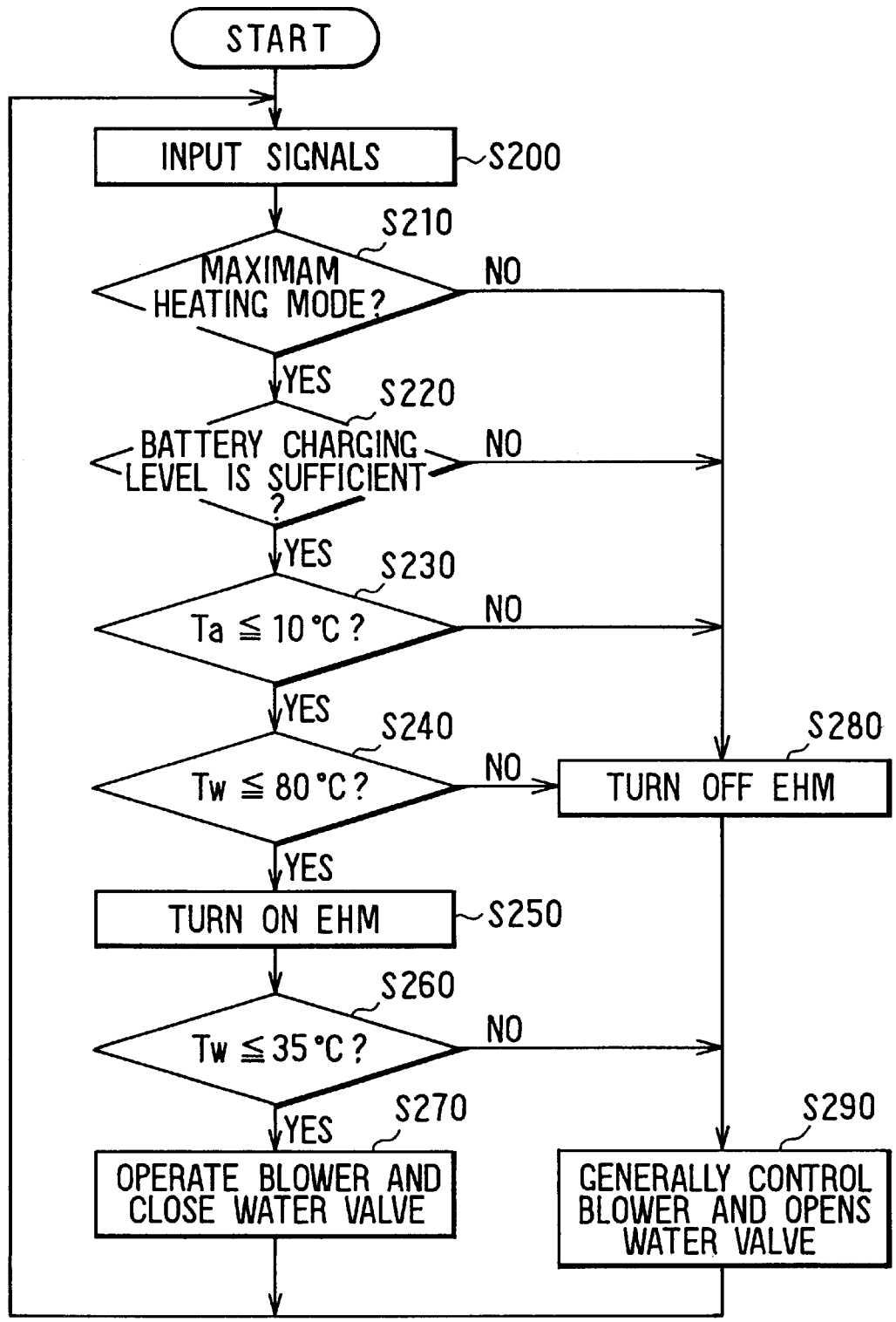
FIG. 18 is a flow chart showing an electric control of the electric control unit according to the eighth embodiment.

In the eighth embodiment, to improve the heating performance of the electric heating members 91–93, the air conditioning apparatus is operated based on a control routine shown in FIG. 18.

The control routine shown in FIG. 18 is started when the ignition switch 129 of the engine 110 and the air conditioning operation switch 136 are turned on. Signals from sensors and switches are input at step S200. Next, at step S110, it is determined whether or not the maximum heating mode is set based on a signal from the maximum heating switch 135. When the maximum heating mode is set at step S210, it is determined whether or not a battery changing level is sufficient according to a signal from a battery voltage sensor 134 at step S220. When it is determined that the battery charging level is sufficient at step S220, it is determined whether or not the outside temperature Ta detected by the outside temperature sensor 133 is equal to or less than 10° C. That is, at step S230, it is determined whether or not the heating mode is necessary in the passenger compartment. Therefore, the temperature is generally set at a low temperature such as 10° C. When the outside temperature Ta is lower than 10° C., it is determined whether or not the water temperature Tw is equal to or lower than a first set temperature (e.g., 80° C.) based on a signal from the water temperature sensor 132 at step S240. When the water temperature Tw is not higher than 80° C., the relay 128 is turned on and electric power is supplied to the electric heating members 91–93.

Next, at step S260, it is determined again whether or not the water temperature Tw is equal to or lower than a second set temperature (e.g., 35° C.). The second set temperature (e.g., 35° C.) is the lowest temperature for heating air using the water. Therefore, in the eighth embodiment, the second set temperature is set at 35° C., for example. When the water temperature Tw is equal to or lower than the second set temperature (e.g., 35° C.), the blower 117 is operated and the hot water valve 113, is closed at step S270.

In the eighth embodiment, when the water temperature Tw is low during operating the electric heating members 91–93, the hot water valve 113 is closed to prevent water having low temperature from flowing into the heating heat exchanger H. Therefore, it can prevent heat generated in the electric heating members 91–93 is transmitted to water having a lower temperature through flat tubes having a high heat transmission performance.

Figure 19A:
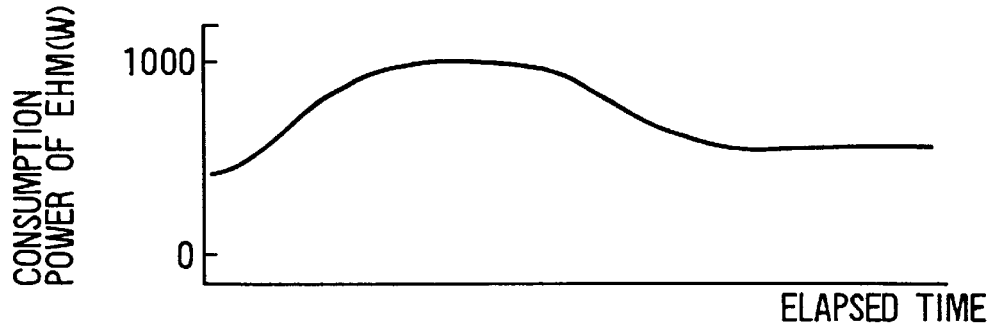
FIGS. 19A–19D are graphs showing the relationship between an elapsed time after turning an air conditioning operation switch ON, and a consumption power (W) of electric heating members, a voltage (V) applied to a blower, an opening degree of a hot water valve, a water temperature Tw(° C.), according to the eighth embodiment.
Figure 19B:
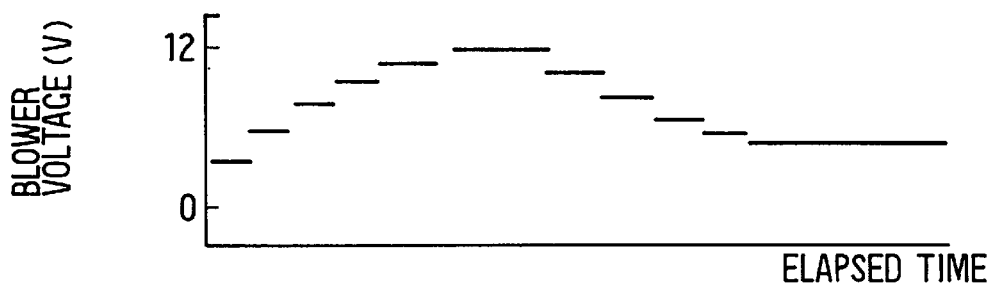
Figure 19C:
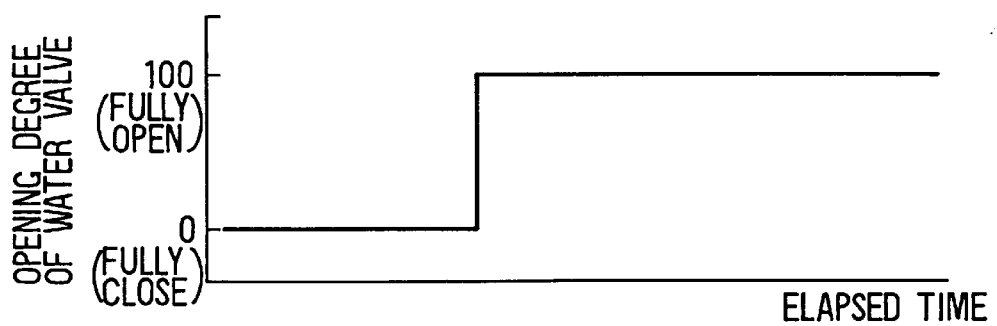
Figure 19D:
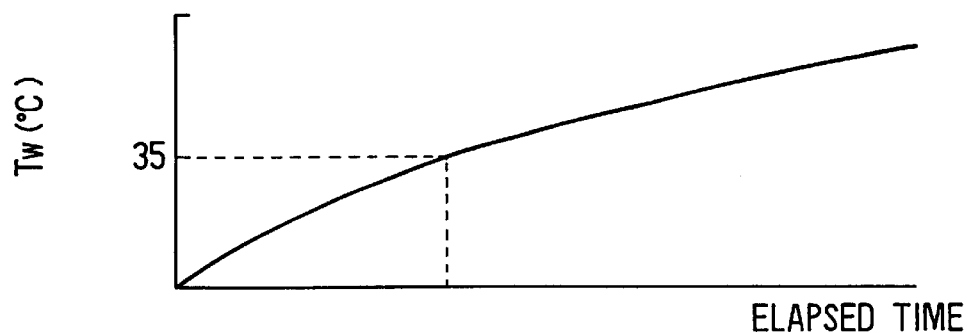

FIG. 19A shows the relationships between an elapsed time after turning the air conditioning operation switch 136 and a consumption power (W) of the electric heating members 91–93, FIG. 19B shows the relationship between the elapsed time and a voltage (V) applied to a driving motor of the blower 117, FIG. 19C shows the relationship between the elapsed time and an opening degree of the hot water valve 113, and FIG. 19D shows the relationship between the elapsed time and the water temperature Tw (° C.). As shown in FIGS. 19A–19D, when the water temperature Tw is lower than a second set temperature (e.g., 35° C.), the hot water valve 13 is fully closed, and voltage applied to the driving motor of the blower 17 is decreased as the water temperature Tw is decreased. Thus, the volume of air blown by the blower 17 is also decreased as the water temperature Tw is decreased. By controlling the volume of air blown by the blower 17, a stove ratio (i.e., heating capacity/air volume) can be increased even at a time immediately after starting the engine. Thus, from a starting time of the heating mode, a feeling for a passenger in the passenger compartment can be improved.

That is, when the water temperature Tw is low at the time immediately after starting the engine, air blown toward the passenger compartment is heated only heat (e.g., consumption power 1 KW) generated by the electric heating members 91–93. Therefore, at this time, by setting the air volume at a low level (e.g., level Lo or Me), the temperature of air blown toward the passenger compartment can be increased.

On the other hand, when it is determined that the maximum heating mode is not set at step S210 or that the outside air temperature Ta is higher than 10° C. at step S230, the electric heating members 91–93 are turned off at step S280. Further, when it is determined that the battery charging level is insufficient at step S220, the electric heating members 91–93 are turned off to prevent an over discharge of the battery 130.

When the electric heating members 91–93 are turned off at step S280, the blower 117 is generally controlled and the hot water valve 113 is opened at step S290. That is, in the general control of the blower 117, the blower 117 is stopped when the water temperature Tw is lower than the second set temperature (e.g., 35° C.), and the blower 117 is driven with a low level air volume when the water temperature Tw reach the second set temperature (e.g., 35° C.). The air volume blown by the blower 117 is gradually increased until the water temperature Tw is increased at a predetermined temperature (e.g., 60° C.); and then, the volume of air blown toward the passenger compartment is changed according to a target air temperature (TAO).

Further, when the water temperature Tw is higher than the second set temperature (e.g., 35° C.) at step S260, the blower 117 is also generally controlled at step S290. In this case, because the water temperature is higher than 35° C., the blower 117 is operated in the low level without stopping the blower 117.

Although the present invention has been fully described in connection with preferred embodiments thereof with reference to the accompanying drawings, it is to be noted that various changes and modifications will become apparent to those skilled in the art.

For example, in the above-described eighth embodiment, when the electric heating members 91–93 are turned on and the water temperature is lower than the second set temperature (e.g., 35° C.), the hot water valve 113 is closed to interrupt the flow of water to the heating heat exchanger 100H. However, in the case, the hot water valve 113 may be slightly opened to reduce the amount of air flowing through the heating heat exchanger 100H.

In the above-described embodiments, the maximum heating switch 32, 135 is provided. However, in a case where the temperature of air blown toward the passenger compartment is automatically controlled, because the position of a temperature adjustment member (e.g., the air mixing door) is automatically calculated in the ECU 23, 127, the maximum heating switch 32, 135 may be omitted.

In the above-described third and fourth embodiments, the temperature of air blown toward the left side in the passenger compartment and the temperature of air blown toward the right side in the passenger compartment are independently controlled using the three electric heating members 91–93; however, the left-right independent temperature control may be performed using the four electric heating members.

In the above-described each embodiment, the electric heating members are integrated with the heating heat exchanger H, H', H", 100H; however, the electric heating members may be independently disposed in the air conditioning case 35, 116 at a downstream air side of the heating heat exchanger H, H', H", 100H. In the above-described each embodiment, hot water circulating in the heating heat exchanger H, H', H", 100H is used as heating source. However, as the heating source, an oil such as an engine oil may be used.

In the above-described embodiments, three or four electric heating members are integrated with the heating heat exchanger H, H', H", 100H. However, the number of the electric heating members integrated with the heating heat exchanger H, H', H", 100H may be arbitrarily changed.

Such changes and modifications are to be understood as being within the scope of the present invention as defined by the appended claims.

What is claimed is:

1. An air conditioning apparatus for a vehicle having a passenger compartment, the air conditioning apparatus comprising:

a case for forming an air passage through which air is blown toward the passenger compartment;

a heating heat exchanger, disposed in said case, for heating air using a fluid flowing through said heating heat exchanger as a heating source;

a plurality of electric heating members, disposed in said case, for heating air flowing through said air passage;

a control unit for controlling electric power supplied to said electric heating members according to a temperature of the fluid supplied to said heating heat exchanger, in such a manner that the whole electric heating members are turned off when the temperature of the fluid is higher than a first predetermined temperature, and a number of said electric heating members to be turned on is increased as the temperature of the fluid is lowered from the first predetermined temperature.

2. The air conditioning apparatus according to claim 1, wherein:
the fluid is cooling water for cooling an engine of the vehicle;
said heating heat exchanger includes a core portion having a plurality of tubes through which the cooling water flows and a plurality of corrugated fins each of which is disposed between adjacent tubes; and
said electric heating members are integrated with said core portion of said heating heat exchanger.

3. The air conditioning apparatus according to claim 2, further comprising
a blower, disposed in said case, for blowing air toward said heating heat exchanger,
wherein the fluid is not supplied to said heating heat exchanger while operating said blower, when the temperature of the fluid is lower than a second predetermined temperature lower than the first predetermined temperature.

4. The air conditioning apparatus according to claim 2, further comprising
a blower, disposed in said case, for blowing air toward the passenger compartment,
wherein said blower is operated and an amount of the fluid supplied to said heating heat exchanger is reduced when the temperature of the fluid is lower than a second predetermined temperature lower than the first predetermined temperature.

5. The air conditioning apparatus according to claim 1, wherein:
said electric heating members are disposed in said air passage symmetrically; and
said control unit electrically switches electric power supplied to said electric heating member symmetrically relative to said air passage.

6. The air conditioning apparatus according to claim 1, further comprising
outside air temperature detecting means for detecting a temperature outside the passenger compartment,
wherein said control unit interrupts electric power supplied to said electric heating members when the temperature detected by said outside air temperature detecting means is higher than a predetermined temperature.

7. The air conditioning apparatus according to claim 1, further comprising:
a temperature adjustment unit for adjusting a temperature of air blown toward the passenger compartment; and
maximum heating mode determining means for determining that the maximum heating mode is set by said temperature adjustment unit,
wherein said control unit interrupts electric power supplied to said electric heating members when said maximum heating mode determining means does not determine the maximum heating mode.

8. The air conditioning apparatus according to claim 1, wherein:
said electric heating members are disposed in parallel in a left-right direction of the vehicle to have a right side heating member placed at a right side of the vehicle and a left side heating member placed at a left side thereof; and
said control unit is controlled to supply electric power only to said right side heating member when the temperature of air blown toward a right side in the passenger compartment is preferentially increased.

9. The air conditioning apparatus according to claim 8, wherein said control unit is controlled to supply electric power only to said left side heating member when the temperature of air blown toward a left side in the passenger compartment is preferentially increased.

10. The air conditioning apparatus according to claim 9, wherein said control unit is controlled to supply electric power to said right side heating member and said left side heating member symmetrically in the left-right direction of the vehicle, when the temperature of air blown toward the left side in the passenger compartment is set to be equal to the temperature of air blown toward the right side in the passenger compartment.

11. The air conditioning apparatus according to claim 1, wherein:
said electric heating members are disposed in parallel in an up-down direction of the vehicle to have an upper side heating member placed at an upper side of the vehicle and a lower side heating member placed at a lower side thereof; and
said control unit is controlled to supply electric power only to said upper side heating member when the temperature of air blown toward an upper side in the passenger compartment is preferentially increased.

12. The air conditioning apparatus according to claim 11, wherein said control unit is controlled to supply electric power only to said lower side heating member when the temperature of air blown toward a lower side in the passenger compartment is preferentially increased.

13. The air conditioning apparatus according to claim 12, wherein said control unit is controlled to supply electric power to said upper side heating member and said lower side heating member symmetrically in the up-down direction of the vehicle, when the temperature of air blown toward the upper side in the passenger compartment is set to be equal to the temperature of air blown toward the lower side in the passenger compartment.

14. An air conditioning apparatus for a vehicle having a passenger compartment, the air conditioning apparatus comprising:
a case for forming an air passage through which air blown toward the passenger compartment;
a heating heat exchanger, disposed in said case, for heating air using a fluid flowing through said heating heat exchanger as a heating source;
a plurality of electric heating members, disposed in said case, for heating air flowing through said air passage;
heating load calculation means for calculating heating load for the passenger compartment; and
a control unit for controlling electric power supplied to said electric heating members according to the heating load calculated by said heating load calculation means, in such a manner that all electric heating members are turned off when the heating load is lower than a predetermined value, and a number of said electric heating members to be turned on is increased as the heating load is increased from the predetermined value.

15. The air conditioning apparatus according to claim 14, wherein:

the fluid is cooling water for cooling an engine of the vehicle;

said heating heat exchanger includes a core portion having a plurality of tubes through which the cooling water flows and a plurality of corrugated fins each of which is disposed between adjacent tubes; and said electric heating members are integrated with said core portion of said heating heat exchanger.

16. The air conditioning apparatus according to claim 15, further comprising outside air temperature detecting means for detecting a temperature outside the passenger compartment, wherein said control unit interrupts electric power supplied to said electric heating members when the temperature detected by said outside air temperature detecting means is higher than a predetermined temperature.

17. The air conditioning apparatus according to claim 15, further comprising:

a temperature adjustment unit for adjusting a temperature of air blown toward the passenger compartment; and maximum heating mode determining means for determining that the maximum heating mode is set by said temperature adjustment unit, wherein said control unit interrupts electric power supplied to said electric heating members when said maximum heating mode determining means does not determine the maximum heating mode.

18. The air conditioning apparatus according to claim 15, wherein:

said electric heating members are disposed in parallel in a left-right direction of the vehicle to have a right side heating member placed at a right side of the vehicle and a left side heating member placed at a left side thereof;

said control unit is controlled to supply electric power only to said right side heating member when the temperature of air blown toward a right side in the passenger compartment is preferentially increased;

said control unit is controlled to supply electric power only to said left side heating member when the temperature of air blown toward a left side in the passenger compartment is preferentially increased; and said control unit is controlled to supply electric power to said right side heating member and said left side heating member symmetrically in the left-right direction of the vehicle, when the temperature of air blown toward the left side in the passenger compartment is set to be equal to the temperature of air blown toward the right side in the passenger compartment.

19. The air conditioning apparatus according to claim 15, wherein:

said electric heating members are disposed in parallel in an up-down direction of the vehicle to have an upper side heating member placed at an upper side of the vehicle and a lower side heating member placed at a lower side thereof;

said control unit is controlled to supply electric power only to said upper side heating member when the temperature of air blown toward an upper side in the passenger compartment is preferentially increased;

said control unit is controlled to supply electric power only to said lower side heating member when the temperature of air blown toward a lower side in the passenger compartment is preferentially increased; and said control unit is controlled to supply electric power to said upper side heating member and said lower side heating member symmetrically in the up-down direction of the vehicle, when the temperature of air blown toward the upper side in the passenger compartment is set to be equal to the temperature of air blown toward the lower side in the passenger compartment.

20. An air conditioning apparatus for a vehicle having a passenger compartment, the air conditioning apparatus comprising:

a case for forming an air passage through which air is blown toward the passenger compartment;

a heating heat exchanger having a plurality of tubes through which a fluid flows, said heating heat exchanger being disposed in said case to heat air using the fluid flowing through the tubes as a heating source;

an electric heating member integrated with said heating heat exchanger, for heating air flowing through said air passage; and a blower for blowing air toward said heating heat exchanger, wherein the fluid is not supplied to said heating heat exchanger while operating said blower, when a temperature of the fluid is lower than a first predetermined temperature during operating said electric heating member.

21. The air conditioning apparatus according to claim 20, further comprising a valve for controlling an amount of the fluid supplied to said heating heat exchanger.

22. The air conditioning apparatus according to claim 20, further comprising air volume control unit for controlling a volume of air blown by said blower, wherein the volume of air blown by said blower is reduced as the temperature of the fluid is reduced, when the temperature of the fluid is lower than the first predetermined temperature.

23. The air conditioning apparatus according to claim 20, further comprising fluid temperature detection means for detecting the temperature of fluid supplied to said heating heat exchanger, wherein said electric heating member is turned off when the temperature of fluid is higher than a second predetermined temperature higher than said first predetermined temperature.

24. The air conditioning apparatus according to claim 20, further comprising outside air temperature detecting means for detecting a temperature outside the passenger compartment, wherein said electric heating member is turned off when the temperature detected by said outside air temperature detecting means is higher than a predetermined temperature.

25. The air conditioning apparatus according to claim 20, further comprising:

a temperature adjustment unit for adjusting a temperature of air blown toward the passenger compartment; and maximum heating mode determining means for determining that the maximum heating mode is set by said temperature adjustment unit, wherein said electric heating member is turned off when said maximum heating mode determining means does not determine the maximum heating mode.

26. The air conditioning apparatus according to claim 20, further comprising:

a battery, mounted on the vehicle, for supplying electric power to said electric heating member; and battery charging level detection means for detecting a charged level of said battery, wherein said electric heating member is turned off when said battery charging level detection means detects that the charged level of said battery is insufficient.

27. The air conditioning apparatus according to claim 20, wherein the fluid is cooling water for cooling an engine of the vehicle.

28. An air conditioning apparatus for a vehicle having a passenger compartment, the air conditioning apparatus comprising:

a case for forming an air passage through which air is blown toward the passenger compartment;

a heating heat exchanger having a plurality of tubes through which a fluid flows, said heating heat exchanger being disposed in said case to heat air using the fluid flowing through said tubes as a heating source;

an electric heating member integrated with said heating heat exchanger, for heating air flowing through said air passage, said electric heating member being operated when the temperature of the fluid is lower than a first temperature; and a blower for blowing air toward said heating heat exchanger, wherein said blower is operated and the amount of the fluid supplied to said heating heat exchanger is reduced, when the temperature of the fluid is lower than a second predetermined temperature lower than said first predetermined temperature during operating said electric heating member.

* * * * *